(12) United States Patent
Awano

(10) Patent No.: US 10,556,401 B2
(45) Date of Patent: Feb. 11, 2020

(54) BONDED STRUCTURE

(71) Applicant: HONDA MOTOR CO., LTD., Tokyo (JP)

(72) Inventor: Katsuyuki Awano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/005,965

(22) Filed: Jun. 12, 2018

(65) Prior Publication Data
US 2018/0361706 A1    Dec. 20, 2018

(30) Foreign Application Priority Data

Jun. 15, 2017 (JP) .................... 2017-117392

(51) Int. Cl.
| | | |
|---|---|---|
| B32B 7/12 | (2006.01) | |
| C09J 11/00 | (2006.01) | |
| B29C 65/00 | (2006.01) | |
| B29C 65/78 | (2006.01) | |
| B29C 65/48 | (2006.01) | |

(Continued)

(52) U.S. Cl.
CPC .............. *B32B 7/12* (2013.01); *B29C 65/483* (2013.01); *B29C 65/7829* (2013.01); *B29C 65/7855* (2013.01); *B29C 66/1122* (2013.01); *B29C 66/1222* (2013.01); *B29C 66/1224* (2013.01); *B29C 66/322* (2013.01); *B29C 66/54* (2013.01); *B29C 66/723* (2013.01); *B29C 66/7212* (2013.01); *B29C 66/7422* (2013.01); *B62D 29/005* (2013.01); *C09J 11/00* (2013.01); *B29L 2031/3002* (2013.01); *B62D 21/11* (2013.01)

(58) Field of Classification Search
CPC .......... C09J 11/00; B32B 7/12; B62D 29/001; B29C 65/483; B29C 65/7829; B29C 65/7855; B29C 66/1122; B29C 66/1222; B29C 66/1224; B29C 66/322; B29C 66/54; B29C 66/7212; B29C 66/723; B29C 66/7422; B29L 2031/3002; B29K 2307/04
See application file for complete search history.

(56) References Cited

U.S. PATENT DOCUMENTS 3,960,394 A * 6/1976 Hubner .................... F16L 47/02
                                                                285/296.1
5,344,681 A * 9/1994 Calhoun ...................... C09J 7/20
                                                                  428/42.3
(Continued)

FOREIGN PATENT DOCUMENTS

JP    2005-282637 A    10/2005
JP    2014-128986 A     7/2014

OTHER PUBLICATIONS

Japanese Office Action dated Feb. 4, 2019 with English translation, 4 pages.

*Primary Examiner* — Patricia L. Nordmeyer
(74) *Attorney, Agent, or Firm* — Rankin, Hill & Clark LLP

(57) ABSTRACT

A bonded structure is disclosed which includes a pair of members facing with each other, and a protrusion integrally formed on at least one of the members, the protrusion protruding toward another one of the members, having a predetermined height, and abutting on the another one of the members to provide a gap holding an adhesive between facing surfaces of a pair of the members to adhere and fix the members and to have a thickness of the adhesive determined by the predetermined height.

5 Claims, 5 Drawing Sheets

(51) Int. Cl.
*B62D 29/00* (2006.01)
*B29L 31/30* (2006.01)
*B62D 21/11* (2006.01)

(56) References Cited

U.S. PATENT DOCUMENTS 6,984,427 B2 * 1/2006 Galkiewicz ............... B44C 1/17
428/40.1
2014/0183895 A1 7/2014 Awano

* cited by examiner

BONDED STRUCTURE

CROSS REFERENCE TO RELATED APPLICATION

This application claims the priority of Japanese Patent Application No. 2017-117392, filed on Jun. 15, 2017 in the Japan Patent Office, the entire specification, claims and drawings of which are incorporated herewith by reference.

BACKGROUND OF THE INVENTION

1. Field of the Invention

The present invention relates to a bonded structure (adhesive structure) in which a plurality of members are bonded with adhesive.

2. Description of the Related Art

When two members are bonded with adhesive, to make a film thickness of adhesive even, it was done to make a gap between two members even.

For example, JP2014-128986 A disclosed a method of sandwiching wires together with adhesive between two members and curing adhesive containing the wires.

SUMMARY OF THE INVENTION

An aspect of the present invention provides an adhesion structure comprising:
a pair of members facing with each other, and
a protrusion integrally formed on at least one of the members, the protrusion protruding toward another one of the members, having a predetermined height, and abutting on the another one of the members to provide a gap holding an adhesive between facing surfaces of a pair of the members to adhere and fix the members and to have a thickness of the adhesive determined by the predetermined height.

DETAILED DESCRIPTION OF THE INVENTION

Prior to describing the present invention, the above-described prior art disclosed in JP2014-128986 A is further argued.

In the structure according to JP2014-128986 A, when two members having tubular shapes are bonded while one of the member is inserted into the other, it is necessary to drawn out wires externally and fixed to prevent the wires from shifting. After curing the adhesive, exposed parts of the wires are cut. In this process, cut ends of the wires are exposed externally. This structure may cause peeling off starting from the wires and decrease in strength due to aged deterioration.

The present invention provides a bonded structure with even thickness of adhesive with avoidance of peeling and decrease in strength due to aged deterioration.

The present invention provides a bonded structure (adhesive structure) avoidable of pealing and decrease in strength due to aged deterioration.

Referring to drawings, a first embodiment is described in detail below. The same references are designated with the same references, and a duplicated explanation is omitted.

Figure 1:
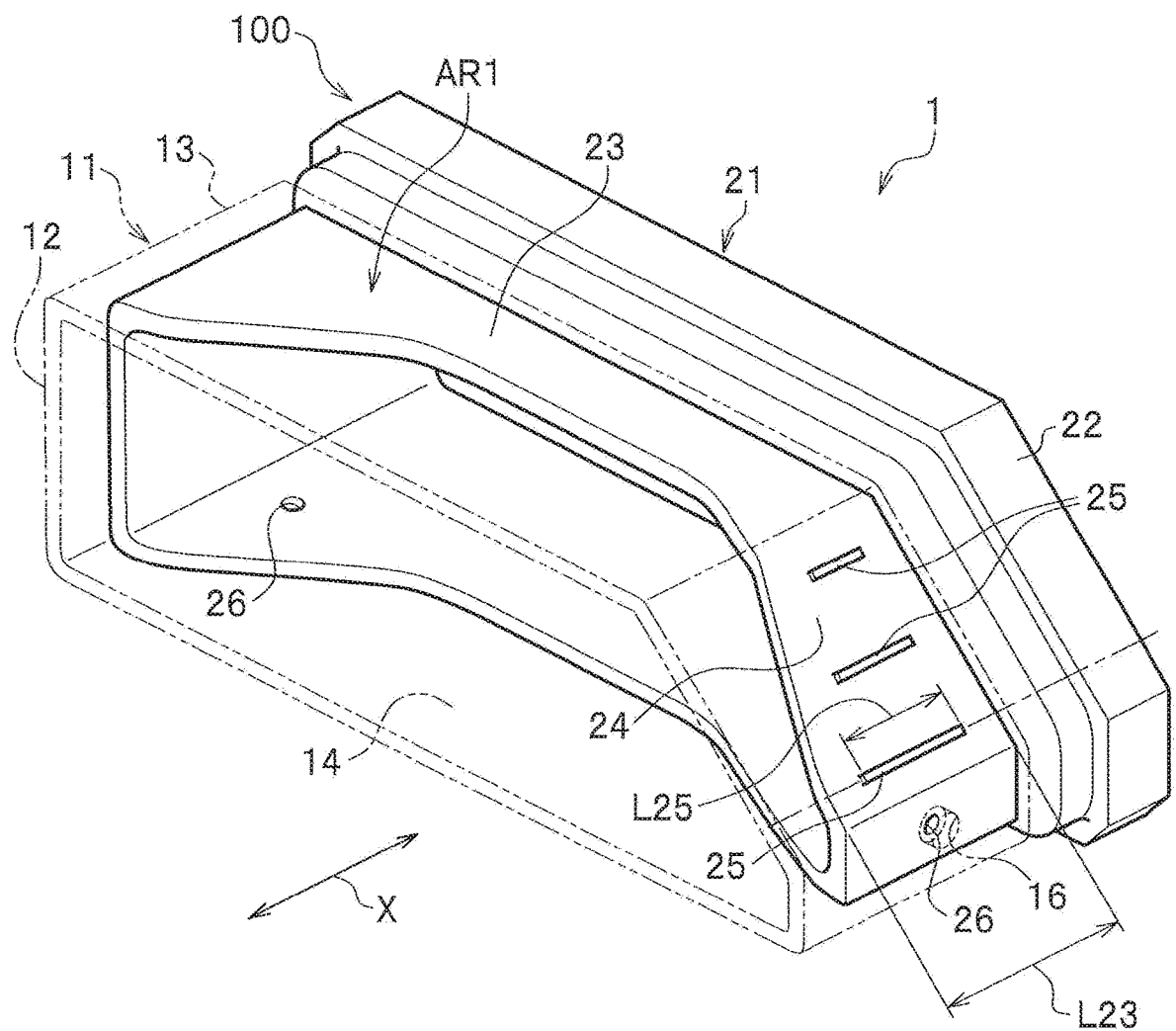
FIG. 1 is a perspective view of a bonded structure according to a first embodiment of the present invention in view from diagonal above.
Figure 2:
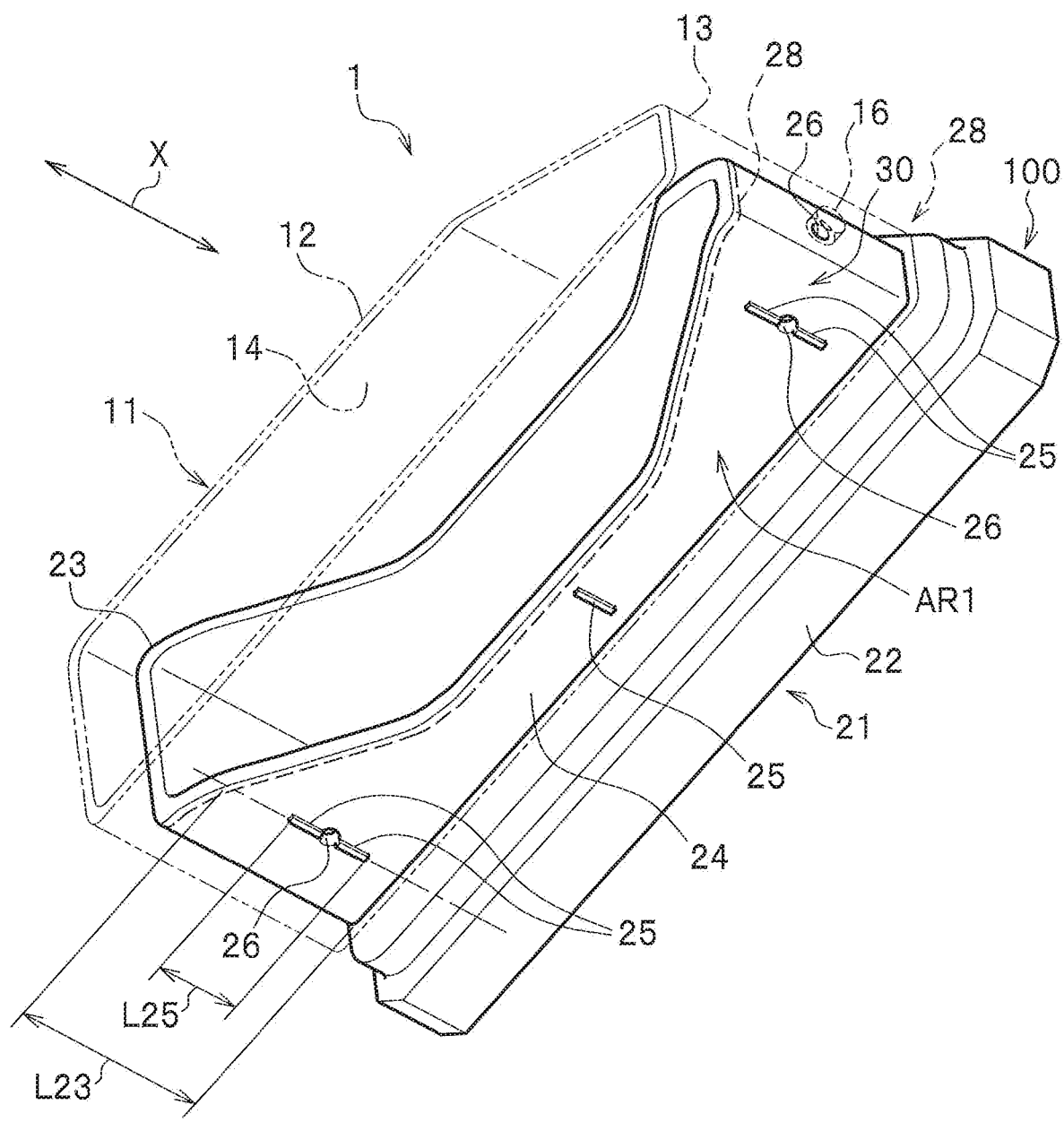
FIG. 2 is a perspective view of a bonded structure according to the first embodiment of the present invention in view from diagonal below.

A bonded structure (adhesion structure) 1 according to the first embodiment is applied to assembling a sub-frame 100 forming a vehicle body (see FIGS. 1 and 2).

The sub-frame 100 is structural bodies for supporting an engine (not shown), a suspension (not shown), a steering (not shown), etc. from the vehicle body. The sub-frame 100 is bridged between a pair of side-frames (not shown) extending in a vehicle front-rear direction.

The sub-frame 100 includes a pair of brackets 21 respectively fixed to the side-frames and a center beam 11 providing connection between a pair of the brackets 21.

The bonded structure 1 according to the first embodiment is used for connecting a pair of the center beam 11 and the brackets 21 (see FIGS. 1 and 2).

More specifically, the bonded structure 1 is a structure for integrally connecting a pair of the members comprising the center beam 11 and the bracket 21.

Further, since a pair of the brackets 21 have the same structure, only one of the brackets 21 is described for convenience of explanation, and description of another bracket 21 is omitted.

In FIGS. 1 and 2, for easy understanding the bonded structure 1, the bracket 21 is indicated with solid lines and the center beam 11 is indicted with two-dot chain lines.

The center beam 11 is made as carbon fiber reinforced plastic (CFRP) and includes a beam body 12 and a beam side bonding part 13 (overlapping part, see FIGS. 1 and 2).

The beam body 12 has a tubular shape having a cross section having a substantially pentagonal shape as shown in FIGS. 1 and 2.

The beam side bonding part 13 is a part to be connected to the bracket 21 and formed at both ends of the beam body 12. The beam side bonding part 13 forms the bonded structure 1 together with a bracket side bonding part 23 described later.

Further the beam side bonding part 13 has an inner circumferential surface as a beam side bonding part 14 to be coated with an adhesive 29.

The beam side bonding part 13 includes through holes 16 opening at respective parts thereof (see FIGS. 1 and 2).

Inserted into the through hole 16 is, for example, a bolt (not shown) connecting the center beam 11 and the bracket 21. The bolt fixes the center beam 11 to the bracket 21 until the adhesive 29 has been cured to avid shift between the center beam 11 and the bracket 21 and dropout.

Figure 3:
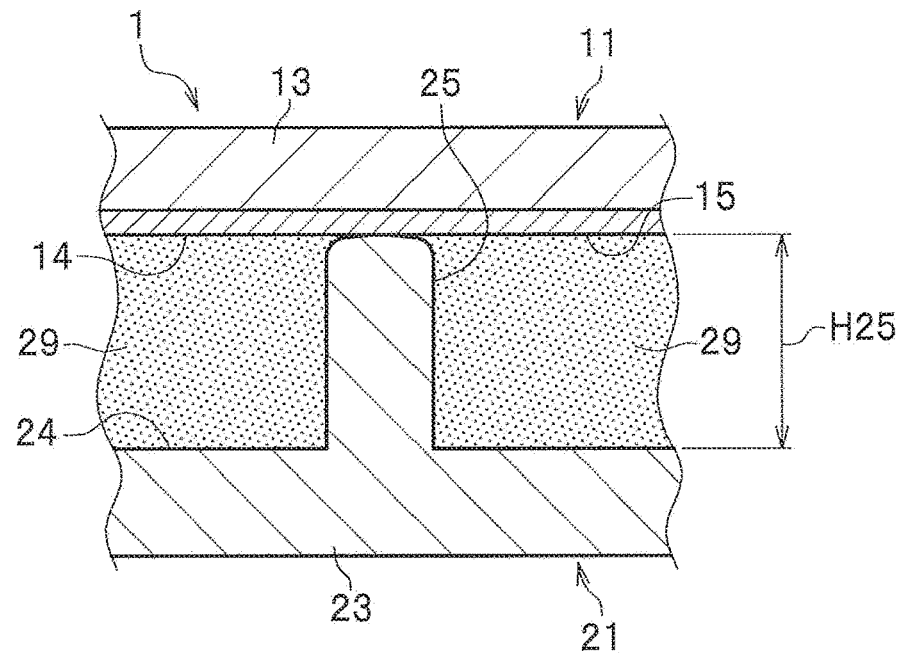
FIG. 3 is a cross section of a main part showing a shape of the protrusion according to the first embodiment of the present invention.
Figure 4:
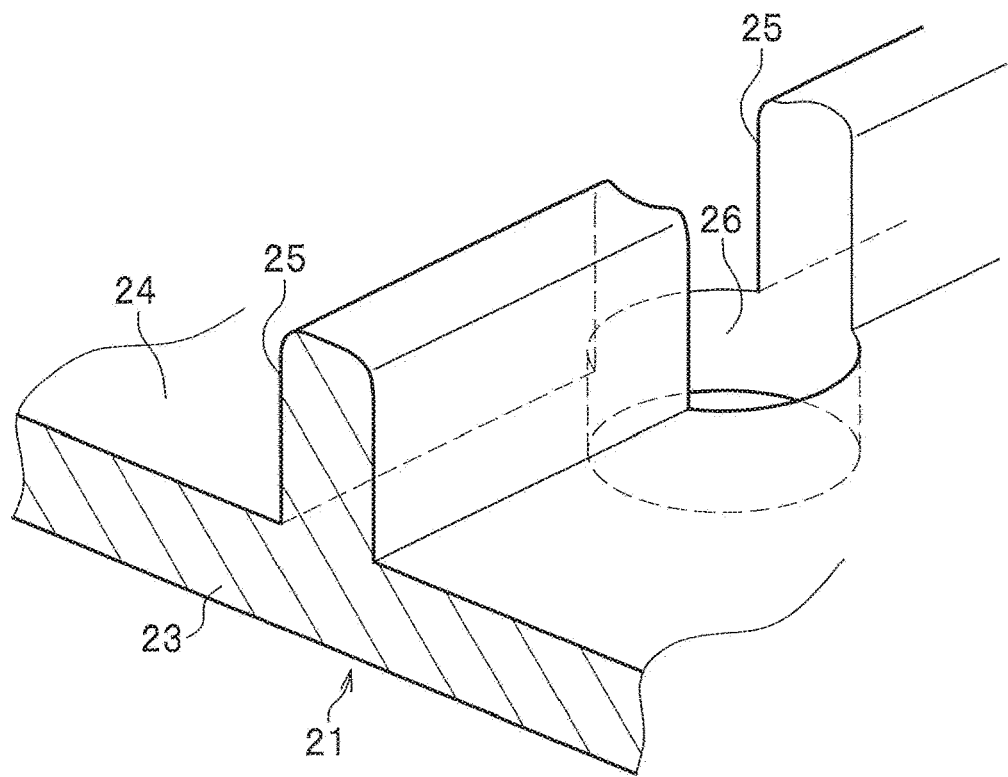
FIG. 4 is a partial perspective view of a main part showing shapes of peripherals of a working hole according to the first embodiment of the present invention.

Further, formed on an inner circumferential surface of the beam side bonding part 13 is an insulation layer 15 as shown in FIG. 3. Intervention of the insulation layer 15 between the CFRP and an aluminum alloy prevents occurrence of electrolytic corrosion.

The bracket 21 is made of an aluminum alloy and includes a vehicle body connected part 22 and the bracket side bonding part 23 (overlapping part, see FIGS. 1 and 2).

The vehicle body connected part 22 is a part to be connected to the vehicle body (not shown) at the sub-frame 100.

In the first embodiment, the vehicle body connected part 22 is shown with a detailed shape of the vehicle body connected part 22 being omitted for convenience of explanation.

The bracket side bonding part 23 is a part to be connected to the center beam 11 and forms the bonded structure 1 together with the above-described beam side bonding part 13 as shown in FIGS. 1 and 2. Further, the bracket side bonding part 23 can be inserted into the tube of the beam side bonding part 13 and has a tube shape having a cross section of a substantially pentagon little smaller than that of the beam body 12.

An outer circumferential surface of the bracket side bonding part 23 is coated with the adhesive 29 and operates as a bracket side bonding surface 24 facing the beam side bonding part 14.

More specifically, in the bonded structure 1 according to the first embodiment connects the center beam 11 and the beam body 12 by coating the beam side bonding part 14 and the bracket side bonding surface 24 with the adhesive 29 and curing of the adhesive 29.

As shown in FIGS. 1 and 2, a plurality of protrusions 25 are formed on respective parts of the bracket side bonding surface 24 to stand on the bracket side bonding surface 24 at a predetermined interval.

The protrusion 25 has a rectangular parallelepiped cross-sectional shape (see FIG. 3) and extends along a sliding direction X (see FIGS. 1 and 2).

The sliding direction X is a direction of sliding the bracket side bonding part 23 into inside of the beam side bonding part 13 when the beam side bonding part 13 is inserted into (assembled to) the bracket side bonding part 23.

In other words, the bracket 21 and the beam body 12 have shapes allowing the bracket 21 to be inserted into inside of the beam body 12 sliding in the sliding direction X with parallel positions each other.

Further, a length L25 of the protrusion 25 along the sliding direction X is set to be shorter than a length L23 along the sliding direction X at a part of the bracket side bonding part 23 on which the protrusion 25 are disposed (see FIGS. 1 and 2). The protrusions 25 are disposed in a region 30 inside a marginal region 28 of a bonded region AR1.

In other words, the protrusion 25 is arranged at a position unable to be viewed from external (a position not exposed to outside).

The bonded region AR1 is a region where the beam side bonding part 14 and the bracket side bonding surface 24 overlap each other and are bonded each other with the adhesive 29 as a cured adhesive layer when the bracket side bonding part 23 is assembled with the beam side bonding part 13 as shown in FIGS. 1 and 2.

Further, a height H25 of the protrusion 25 is, as shown in FIG. 3, set such that the tip of the protrusion 25 abuts the insulation layer 15 in a state that the bracket side bonding part 23 is inserted into a tube of the beam side bonding part 13 coaxially.

Out of a plurality of the protrusion 25, there are protrusions 25 each having a working hole 26 opening as shown in FIGS. 1 and 2.

The working through hole 26 is a through hole penetrating the bracket side bonding part 23 and disposed just behind the protrusion 25 in the sliding direction X.

After the bracket 21 has been inserted into the center beam 11, a bolt (not shown) is inserted into the through hole 16 and the working hole 26 and screw-fastening is performed to have positioning between the center beam 11 and the bracket 21. The through hole 16 and the working hole 26 are disposed overlapping when the bracket 21 has been inserted into the inside of the beam body 12.

Next, an operation and advantageous effect of the first embodiment are described below.

In the bonded structure 1 according to the first embodiment, the protrusion 25 protrudes from the bracket 21 as one of the members toward the center beam 11 as another one of the members by the predetermined height H25 (see FIG. 3).

Accordingly, when the center beam 11 is inserted into the bracket 21, a gap between both connecting surfaces of the center beam 11 and the bracket 21 can be kept with a height not smaller than the height H25 of the protrusion 25.

This eliminates a poor bonding caused by insufficiency of thickness of the adhesive 29 and provides a stable bonding strength because the adhesive 29 between the members is formed to have a thickness more than the height H25 of the height of the protrusion 25.

Further, the bonded structure 1 does not use linear materials such as wire members, which suppresses peeling off between members caused from the linear members arranged up to the end of bonding part.

Further, the protrusions 25 decrease the space volume between the members if the gap length is unchanged, so that an amount of the adhesive 29, which is relatively expensive, can be decreased, which reduces the manufacturing cost.

In addition, the protrusions 25 are further provided, which increases a boding area, so that the bonding strength with the adhesive 29 can be increased. Regarding this, a thickness of the protrusion 25 in direction perpendicular the sliding direction X may be smaller than the height H25 to increase the bonding area.

In the bonded structure 1, the protrusion 25 is provided extending along the sliding direction X which is a direction when one of the members (the center beam 11 and the bracket 21) is assembled with another one of the members by sliding in the sliding direction X.

Figure 5:
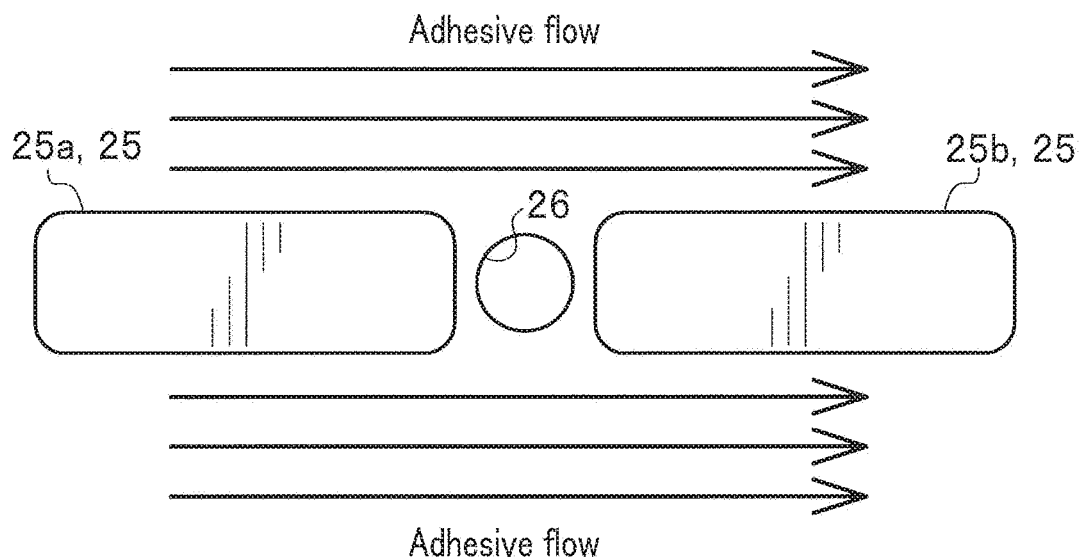
FIG. 5 is an illustration showing a positional relation between the protrusions and the working hole according to the first embodiment of the present invention.

Accordingly, as shown in FIG. 5, the adhesive 29 applied to one of connecting planes flows along the protrusion 25 when one of the members is assembled with another one of the members, which prevents a poor bonding caused by not flowing around of the adhesive 29 to a rear side of the protrusion 25.

This prevents poor bonding and provides a stable bonding strength.

In the bonded structure 1 according to the first embodiment, as shown in FIG. 5, the working hole 26 is positioned between the protrusion 25*a* and the protrusion 25*b* (just behind the protrusion 25*a* in the sliding direction X and in front of the protrusion 25b). However, the present invention is not limited to this position.

Figure 6:
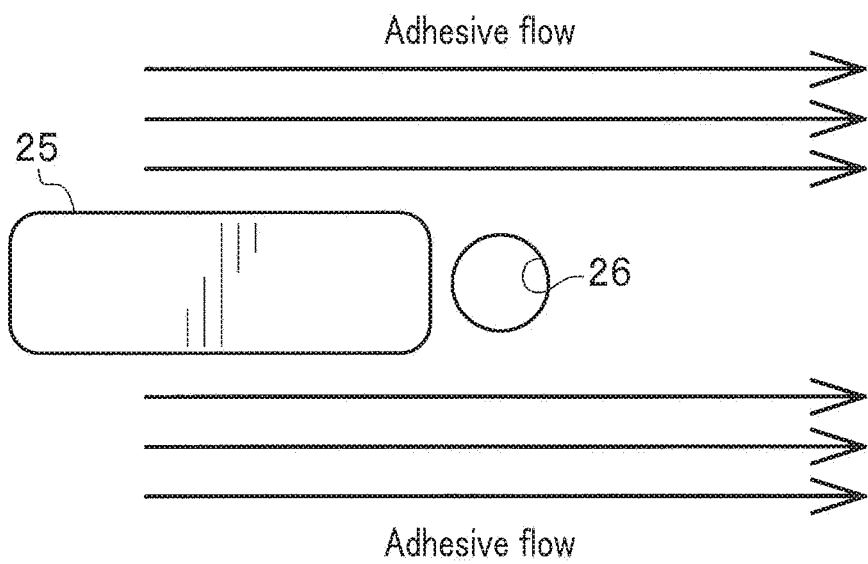
FIG. 6 is an illustration showing a positional relation between the protrusion and the working hole according to a second embodiment of the present invention.

For example, as shown in FIG. 6, it is allowed that the protrusion 25 positioned behind the working hole 26 in the sliding direction X can be omitted as long as the working hole 26 is positioned behind the protrusion 25 in the sliding direction X.

In the bonded structure 1 according to the first embodiment, the protrusions 25 are not exposed at a marginal area 28 of the bonded region AR1. When a shearing force or a bending stress is applied to the connecting parts of a pair of the members, the stress is concentrated at the marginal area 28. Accordingly, to prevent peeling between the members, it is desirable to have even bonding strength.

On the other hand, in the bonded structure 1 according to the first embodiment, because the protrusion 25 is disposed at such a position that the protrusion 25 is not exposed from the marginal region 28 of the bonded region AR1, so that the bonding strength at the peripheral part can be made evenly.

This suppresses peeling off between both members starting from the protrusion 25 and prevents decrease in the bond strength.

A part of the protrusions 25 of the bonded structure 1 according to the first embodiment accompany the working holes 26 which are through wholes behind the protrusion 25 in the sliding direction X. The working hole 26 opens at the position, which suppresses invading of the adhesive 29 into the working hole 26 when one of the members is assembled with another one of the working holes 26 with the members sliding.

This prevents adhesive failure caused by no reaching of the adhesive 29 to a place where the adhesive 29 is to be coated.

Further, this can reduce the manufacturing cost because an amount of the adhesive 29 entering the working hole 26 which becomes wasted can be decreased.

Further, workability can be improved by omitting a process of plugging the working hole 26 not to cause the adhesive 29 to flow into the working hole 26.

In the bonded structure 1, a cross-sectional shape of the protrusion 25 is a rectangular.

This cross-sectional shape makes it more difficult for the adhesive 29 to flow around to the back side of the protrusion 25, which further suppresses invading of the adhesive 29 into the working hole 26.

In the bonded structure 1 according to the first embodiment, the protrusions 25 are provided only on a side of the bracket 21. However, the present invention is not limited to this.

For example, there may a configuration in which the protrusions 25 are provided only on the side of the center beam 11 and another configuration in which both of the center beam 11 and the bracket 21 have the protrusions 25.

Even in such configurations, the same operation and advantageous effect can be provided.

In the first embodiment, the present invention has been applied to the bonded structure between the composite member (CFRP) and a metal (aluminum alloy). However, the present invention is not limited to this combination.

For example, the present invention is applicable to a bonded structure for different metals, and a bonded structure between composite members.

Next, a second embodiment is described below referring to the drawings. In the description, the same elements as those in the above described embodiment are designated with the same references and a duplicated explanation is omitted.

Figure 7:
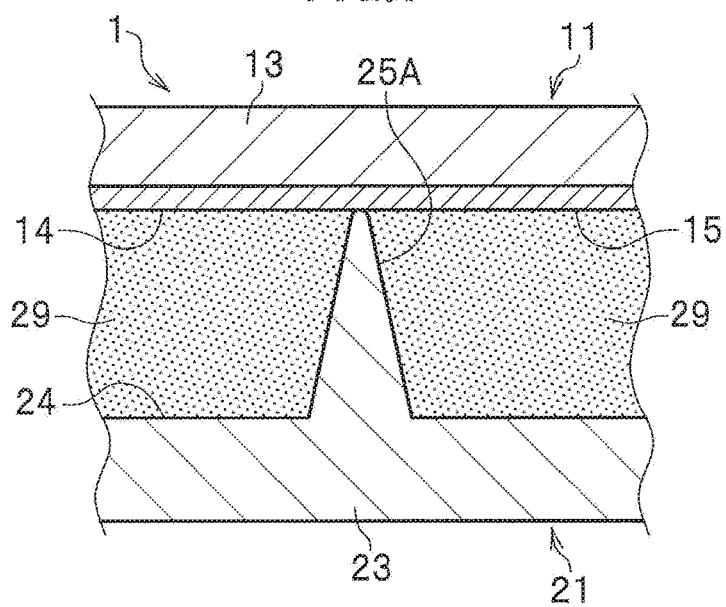
FIG. 7 is a cross section of a main part showing a shape of the protrusion according to a third embodiment of the present invention.

As shown in FIG. 7, a difference between the first embodiment and the second embodiment is in the shape of a protrusion 25A.

The protrusion 25A according to the second embodiment has a substantially triangle shape in a cross section.

Configuration of the protrusion 25A extending along the sliding direction X on the bracket side bonding surface 24 and configuration of the protrusions 25A are disposed at the position that the protrusion 25 is not exposed from the peripheral part of the bonded region AR1 are the same as those of the first embodiment.

Next, an operation and an advantageous effect are described below.

In the bonded structure 1, the protrusion 25A has a substantially triangle shape in cross section, which makes it easy for the adhesive 29 to flow around the back side of the protrusion 25A.

This reduces unevenly coating with the adhesive 29, so that a stronger bonding strength is provided in the bonded structure 1.

Further, making a cross-sectional shape of the protrusion 25A in the substantially triangle having a taper top provides linear contact between the tip of the protrusion 25A and the beam side bonding part 14.

This does not decrease the area of the adhesive 29 coated on the beam side bonding part 14 (another bonding surface), so that the bonded structure 1 provides a stronger boding strength because the area to be coated with the adhesive 29 is not narrowed.

Next a third embodiment is described below referring to the drawings. In the description, the same elements as those in the above described embodiments are designated with the same references and a duplicated explanation is omitted.

Figure 8:
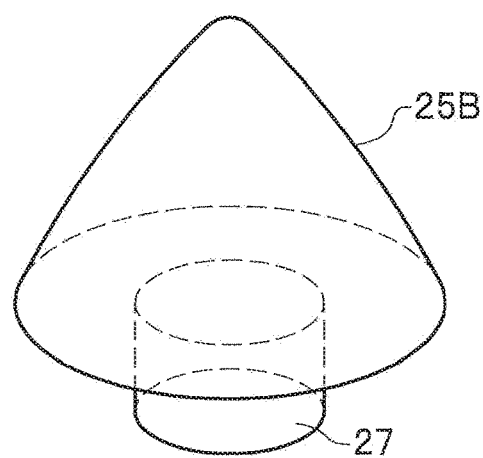
FIG. 8 is a cross section of a main part showing a shape of the protrusion according to a fourth embodiment of the present invention.

As shown in FIG. 8, a difference between the third embodiment and the first and second embodiments is in a shape of a protrusion protrusion 25B.

The protrusion 25B according to the third embodiment is formed with a different material from the bracket 21, i.e., a plastic material not causing electrolytic corrosion between the CFRP and the aluminum alloy. In addition the protrusion 25B has a substantially conical shape with a tapered tip. The protrusion 25B has a press-fit protrusion 27 on a bottom surface to the protrusion 25B.

The press-fit protrusion 27 is press-fit into a protrusion receiving hole (not shown) which is a hollow portion formed on the bracket side bonding surface 24 to fix the protrusion 25B on the bracket side bonding surface 24.

Next, an operation and an advantageous effect are described below.

In the bonded structure 1 according to the third embodiment, the cross-sectional shape of the protrusion 25B is a substantially conical shape, This reduces unevenly coating with the adhesive 29, so that a stronger bonding strength is provided in the bonded structure 1.

Further, making a cross-sectional shape of the protrusion 25B in the substantially triangle having taper top provides point contact between the tip of the protrusion 25B and the beam side bonding part 14.

This does not decrease the area of the adhesive 29 coated on the beam side bonding part 14 (another bonding surface), so that the bonded structure 1 provides a stronger boding strength because the area to be coated with the adhesive 29 is not narrowed.

In the second and third embodiments, the protrusion 25A having the substantially triangle in cross section and the protrusion 25B having a conical shape are exemplified. However, the present invention is not limited to this.

Figure 9:
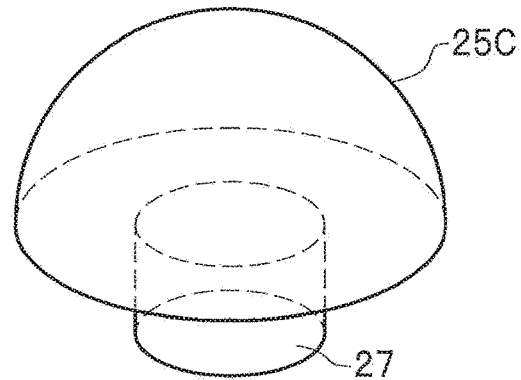
FIG. 9 is a cross section of a main part showing a shape of the protrusion according to a fifth embodiment of the present invention.

For example, as shown in FIG. 9, a protrusion 25C having a hemisphere shape can be used.

This shape makes it more difficult to be deformed than the conical shape, etc., so that a part management becomes easy.

DESCRIPTION OF REFERENCE SYMBOLS

1 bonded structure
11 another member (center beam)
21 one of members (bracket)
25 protrusion
26 working hole
H25 height
X sliding direction

The invention claimed is:

1. An adhesion structure comprising:
a pair of members facing with each other; and
a protrusion integrally formed on at least one member of the pair of members, the protrusion protruding toward another member of the pair of members, having a predetermined height, and abutting on the another member of the pair of members to provide a gap holding an adhesive between facing surfaces of the pair of members to adhere and fix the pair of members and to have a thickness of the adhesive determined by the predetermined height;
wherein the protrusion extends in a sliding direction in which the one member of the pair of members is slid on the another member of the pair of members when the pair of members are assembled with each other,
wherein the at least one member of the pair of members includes a working hole defined therein, the working hole disposed behind the protrusion in the sliding direction,
wherein the working hole is a positioning hole for assembling the pair of members, and
wherein the adhesive adheres and fixes the pair of members by adhesive curing.

2. The adhesion structure as claimed in claim 1, wherein the adhesive defines a bonded region having a marginal area thereof and wherein the protrusion is disposed inside the marginal area.

3. The adhesion structure as claimed in claim 1, wherein the protrusion is tapered.

4. The adhesion structure as claimed in claim 1, wherein the pair of members have shapes allowing both of the pair of members to be slid relative to each other in the sliding direction with parallel positions to face each other, and
wherein the protrusion extends on the facing surface of the least one member of the pair of members in the sliding direction.

5. The adhesion structure as claimed in claim 4, wherein the pair of members have tubular shapes to allow one member of the pair of members to be inserted into another member of the pair of members with sliding in the sliding direction.

* * * * *